United States Patent [19]
Stenkvist

[11] 3,929,457
[45] Dec. 30, 1975

[54] DIRECT CURRENT ELECTRIC ARC FURNACE AND METHOD FOR MELTING METAL SCRAP

[75] Inventor: Sven Einar Stenkvist, Vasteras, Sweden

[73] Assignee: Allmanna Svenska Elektriska Aktiebolaget, Vasteras, Sweden

[22] Filed: Nov. 16, 1973

[21] Appl. No.: 416,400

[30] Foreign Application Priority Data
Nov. 17, 1972 Sweden.............................. 14953/72

[52] U.S. Cl............................................ 75/10 R; 13/9
[51] Int. Cl.².......................... C22B 4/00; H05B 7/18
[58] Field of Search...................................... 13/9; 75/10–12

[56] References Cited
UNITED STATES PATENTS

| | | | |
|---|---|---|---|
| 3,463,629 | 8/1969 | Hatch | 75/11 |
| 3,472,650 | 10/1969 | Sibakin | 75/11 |
| 3,610,795 | 10/1971 | Antoine | 13/9 |
| 3,665,085 | 5/1972 | Dumont-Fillon | 75/11 |
| 3,715,200 | 2/1973 | Archibald | 75/11 |
| 3,835,230 | 9/1974 | Valchev | 13/9 |

*Primary Examiner*—Peter D. Rosenberg
*Attorney, Agent, or Firm*—Kenyon & Kenyon Reilly Carr & Chapin

[57] ABSTRACT

For direct current electric arc furnace melting of metal scrap a furnace includes a vessel having a bottom wall shaped so that a portion of the melt is collected in the latter after initial melting or introducing of molten metal to start the operation. This vessel has means for feeding scrap in pieces to the peripheral portion of the bottom wall to form at that location an annular pile, or one or more separate piles, of unmelted scrap contacting and electrically connecting with the melt but extending upwardly to a level above the melts level. An electrode is positioned vertically with an arcing and maintained above the level of the melt to form an arc therebetween, this electrode being spaced from the pile or piles of scrap when the operation has started. The melt is made an anode by maintaining a positive electrical connection from a DC power source with the pile or piles of scrap at a position above the level of the melt so that the current passes through the unmelted scrap, with consequent heating of the scrap while magnetically tending to keep it piled, and through the melt and via an arc to the arcing electrode, the latter being negatively connected with the power source. The arcing electrode is made of carbon and in the described way enjoys the advantages of operating as a cathode without requiring an arcing anode electrode or an electrically conductive vessel bottom. More than one negatively connected arcing electrode may be used.

6 Claims, 1 Drawing Figure

U.S. Patent   Dec. 30, 1975   3,929,457
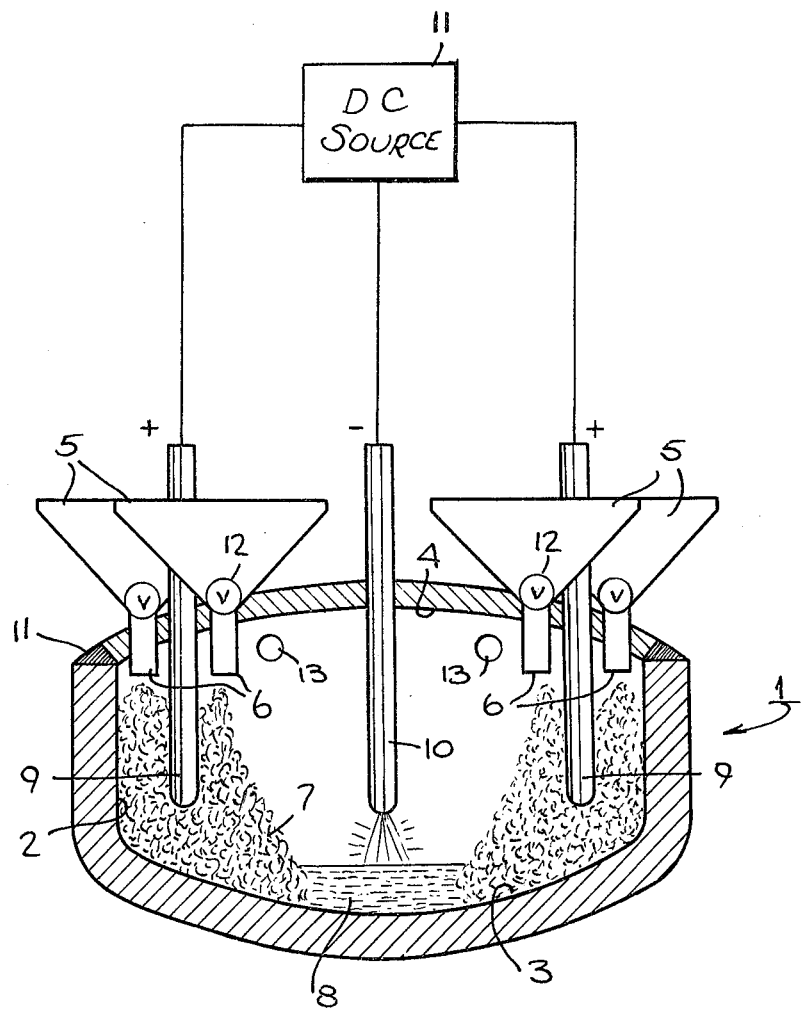

DIRECT CURRENT ELECTRIC ARC FURNACE AND METHOD FOR MELTING METAL SCRAP

BACKGROUND OF THE INVENTION

Today, metal scrap, particularly steel scrap, is usually melted in a furnace powered by three-phase alternating electric current and using three carbon electrodes, one for each phase, the charge forming the zero point in the three-phase system. The arcs formed between the electrodes and the metal charge in the furnace, are free or direct arcs extending between the electrodes and the metal in the furnace.

Heretofore, the use of direct current has required at least two carbon electrodes respectively of positive and negative polarity, to form direct or free arcs between the electrodes and the metal. This means that one electrode operates as a cathode and the other operates as an anode with respect to the melt. If a single electrode is used, the hearth supporting the metal must be made electrically conductive which has disadvantages from the construction, installation and operating viewpoints. In all such instances, a plurality of electrodes may be used having the same polarity so that they function like a single electrode.

SUMMARY OF THE INVENTION

The object of the present invention is to provide a direct current electric arc furnace and method for melting metal scrap using one or more carbon or graphite electrodes operating as a cathode and forming direct or free arcs between their ends and the charge, without requiring an electrically conductive hearth or the use of one or more other carbon arcing electrodes which must operate as an anode.

Such a furnace is desirable because by using one or more carbon electrodes powered by direct current and operating as a cathode, as compared to their operation as an anode, and as compared to the alternating current type furnace, the following advantages are obtained:
1. Less electrode consumption
2. More stable arcs
3. More efficient heat transfer to the charge
4. Less wear on the furnace lining According to the present invention, for direct current electric arc furnace melting of metal scrap, particularly steel scrap, for example in small pieces, a suitable vessel is used, normally cylindrical, having a bottom wall of hearth shaped so that at least a central or otherwise chosen portion of the melt is collected in the latter during operation of the furnace, and the vessel, normally having a closed top or cover, is provided with means for feeding the scrap charge to the peripheral portion of this hearth to form an annular pile, or one or more separate piles, of unmelted scrap physically contacting end electrically connecting with the melt and extending upwardly to a level above the latter's level. One or more cathode carbon or graphite arcing electrodes, negatively connected with a suitable DC power source, are positioned, normally vertically, above the level of this charge or melt in arcing relation therewith and spaced from the unmelted scrap. The hearth is shaped so that the scrap can be plied at a position where it is in electrical contact with the melt by physical contact therewith, and the positive electrical connection with the DC power source is made through the scrap so that the current travels through the latter for at least some distance before reaching the melt from which the arc then jumps to the cathode electrode or electrodes. Preferably this electrical connection with the scrap is effected by one or more vertical non-arcing electrodes arranged adjacent to the periphery of the vessel's bottom wall or hearth and its side wall and which extend vertically into the pile of scrap far enough to establish good electrical contact with the scrap but so that the bottom end or ends of the electrode or electrodes are maintained always above the rising level of the melt. The last-mentioned electrodes with the surrounding pile will be positively connected to the DC source and will be acting as anodes.

When the furnace is in operation, the current travels through the unmelted metal scrap, heating it by electrical resistance heating and magnetically causing it to tend to cling to the positive electrode, and to the melt and via the arc to the cathode electrode or electrodes.

The result is that all arcing carbon electrodes operate as a cathode with the attendant advantages previously described, freed from the complications of an electrically conductive hearth and without the necessity for one or more of the carbon electrodes operating as an arcing anode electrode having none of the advantages described. All the positively connected electrodes are in contact with solid charge and will not act as arcing electrodes where said advantages were not present.

BRIEF DESCRIPTION OF THE DRAWING

The accompanying drawing schematically shows in vertical section one example of a furnace embodying the principles of the present invention.

DETAILED DESCRIPTION OF THE INVENTION

Referring to this drawing, the vessel 1 has a cylindrical side wall 2 and a concave bottom wall or hearth 3. The top of the vessel is closed by a cover 4. A plurality of hoppers 5 lead to ducts 6 extending vertically down through the cover 4 adjacent to the periphery of the bottom wall or hearth 3 and adjacent to the side wall 2. The furnace is charged via these hoppers and spouts so as to form an annular pile of solid or unmelted scrap 7, the central portion of the concave hearth 3 containing at least a portion of the melt 8.

The scrap should be in the form of small enough pieces to permit the charging and the formation of the annular pile of unmelted scrap. Separate piles may be formed beneath each spout, but the annular form has advantages. Also, the concavity or other shape that may be used for the bottom wall or hearth 3 should be such as to permit the formation of the pile or piles of unmelted scrap as well as the formation and maintenance of the centralized (or otherwise located) melt or pool of molten metal 8.

A plurality of non-arcing electrodes 9 are passed through the roof 4 far enough to project into the pile or piles of unmelted scrap 7 to form good electrical contact with the latter but so that the lower ends of these electrodes are always spaced above the level of the melt 8. A single carbon arcing electrode is shown at 10, this being vertically passed through the roof 4 with its lower end positioned to form an arc 10a extending to it from the melt 8. More than one of these electrodes 10 may be used if electrically interconnected with the same polarity, vertically positioned as are the non-arcing electrodes 9. The arcing electrode 10 is a carbon or graphite electrode and the non-arcing electrodes 9 may also be carbon or steel electrodes or of other conductive material. In all instances these may be electrodes made from carbon in graphite form such as are used for electric arc metallurgical furnaces in general, recognizing that the electrode or electrodes 10 may possibly include elements intended for possibly subsequent metallurgical processing of the metal scrap as suggested hereinafter.

As shown, the electrodes are connected with a source of direct electric current 11 so that the non-arcing electrodes 9 are of positive polarity while the arcing electrode or electrodes 10 are of negative polarity to operate as a cathode.

The non-arcing electrodes 9 may form an annular series of uniformly interspaced electrodes. They should extend far enough into the unmelted scrap to reduce the electrical contact resistance to the lowest possible minimum. Althouth not illustrated, the melt 8 during melting of the scrap may extend beneath the bottom of the pile 7, but the bottom ends of the electrodes 9 should be maintained always spaced above the level of the melt 8. The spacing should be such as to avoid arcing between the bottom ends of the non-arcing electrodes 9 and the melt because if this occurred the electrodes 9 would operate as arcing anodes. As shown, the non-arcing electrodes 9 function only as electrical conductors capable of resisting the high temperatures involved by the furnace operation.

The current goes radially inwardly through the scrap 7 to the centrally located melt 8 and via the arc 10a to the electrode 10 with the latter enjoying the advantages previously stated.

The furnace of this invention may be designed for batch or continuous operation. When batch operated, the furnace is charged so that the pile 7 extends into the central portion of the hearth 3. The arc is struck and the melting begins. When the pile 7 reduces to the point where there is a risk of either an excessively high electrical resistance or an open circuit or arcs from the electrodes 9, the melt 8 correspondingly increasing, the operation is stopped, the melt is tapped, wholly or partially, the furnace is recharged to again form the highest possible pile of the scrap 7 and the furnace operation renewed. Together with the surrounding solid charge 7 these electrodes 9 are acting as anodes, but not as arcing electrodes.

The furnace may be designed to be tapped centrally with respect to the hearth 3 so that continuous scrap charging is possible. Possibly the furnace may be designed as a tilting furnace having a side tapping spout or opening with the melt flowing through any remaining unmelted scrap representing the residue of the pile 7. These details are not shown because their design should be within the ability of any person of skill in this art.

It may be desirable to operate the furnace so that the melting proceeds under some atmosphere other than air, such as a suitable inert atmosphere. In such an instance the cover or roof 4 may be sealed with the vessel 1 as schematically indicated at 11, and the electrodes may be passed through this cover in the same fashion they are in the case of arc furnaces operated under either a vacuum or as containing a gas, this applying correspondingly to the spouts 6 of the hoppers 5. In this case the hoppers 5 would be provided with suitable valves 12 which are open for charging and thereafter closed, and the furnace may be provided with one or more ports 13 for evacuation and/or gas filling purposes.

Electrical engineering knowledge is available for designing the furnace to determine the height of the pile 7 relative to the space confined by the vessel 1 and its cover, and the distribution of this pile, to obtain a substantial production of heat from the electrical resistance the pile offers to the current passing from the non-arcing electrodes 9 to the melt 8 and via the arc 10a to the arcing cathode electrode 10. Thus, in carrying the current so that the non-arcing electrodes 9 need not operate as arcing anodes, the electrical resistance involved by the pile of scrap 7 results in a useful heat input to the furnace. The major heating is, of course, via the arc or arcs 10a depending upon whether or not one or more of the arcing electrodes 10 are used, while the nature of scrap metal in small pieces serves mainly to keep the scrap in piled condition.

The electrical resistance involved by the passage of the current through the pile of scrap 7 has another advantage, as explained below.

In the case of any electric arc the current/voltage characteristics of the arc are such that increasing current causes a reduced voltage drop in the arc. This requires the use of ballast in the electric circuit. With the present invention this ballast is wholly or partially provided by the electrical resistance of the scrap, instead of by an external resistance somewhere in the circuit of the power system where the ballast heat must be dissipated uselessly and lost. When alternating current must be converted to direct current to operate any direct current electric arc furnace, without a suitable ballast the alternating current power supply may suffer an undesirable power factor whereas with the present invention with the ballast automatically provided by the scrap 7, with the resulting heat being used to advantage, with proper design of the furnace the alternating current power system need not have its power factor unduly affected by the furnace operation.

It is possible to start the operation of the furnace by first charging a small amount of molten metal to initially form the pool 8 with the pile or piles of scrap charged as described. After melting a judicious amount of the unmelted scrap or charge, the furnace may be tapped but allowed to retain some of the molten melt. This operation may be continued repetitiously. In all events, the unmelted scrap is initially heated not only by the electric resistance previously described, but by the heat radiated by the arc 10a directly inwardly into the unmelted scrap, this promoting more rapid melting. This also protects the side wall of the vessel 1 because the pile of scrap may be formed as an annulus or shield between the arc heat and this side wall.

Throughout the foregoing, the concept has been to melt scrap metal, particularly steel scrap, but the furnace and the principles of its operation may be used for melting any electrically conductive material capable of being piled. In the case of steel scrap the melt would normally be further refined by any suitable steel refining method and equipment.

However, assuming that all of the electrodes are carbon or graphite electrodes, the furnace may also be used for refining. In such an instance, when the pile of scrap 7 has been melted down as fully as possible, the polarity of the electrodes may be reversed with the positive and negative electrodes then operating in series as arcing electrodes, the electrode or electrodes 10 then being the anode and permitting the refining operation to proceed. This involves rapid loss or burn-off of the electrode or electrodes 10 but this is to be expected in the case of a steel refining operation.

In all cases the non-arcing electrodes 9 and arcing electrodes 10 may be vertically moved up and down by using normal electric arc electrode position controlling equipment (not shown). The equipment required to feed the scrap, in particle or piece form, into the vessel 1 may be designed in the same manner as is equipment used for making furnace additions to electric arc metallurgical refining furnaces providing they are properly located to form the annular pile of material previously described.

What is claimed is:

1. A direct current electric arc furnace for melting metal scrap, comprising means for containing a molten scrap melt and a charge of unmelted scrap in electrical contact with this melt, said scrap extending from this melt to a location free from said melt, at least one carbon electrode positioned to form an open arc between this electrode and said melt, a direct current power source and means for electrically conducting direct current from said source to said unmelted scrap at said location and through said unmelted scrap and melt and an arc, to said electrode so that the said electrode operates as a cathode.

2. The furnace of claim 1 in which said containing means comprises a vessel having a side wall and a bottom wall shaped so that at least a portion of said melt is maintained centrally thereon, said vessel having means for feeding said charge to the peripheral portion of said bottom wall to form a pile of unmelted scrap contacting said portion and extending upwardly to a level above said melt, said electrode being positioned substantially vertically above the level of said melt and spaced from said pile of scrap.

3. The furnace of claim 2 in which said electrically conducting means includes at least one vertical electrode extending downwardly into said pile of unmelted scrap in electrical contact therewith and having a lower end terminating above the level of said melt.

4. The furnace of claim 3 in which said electrode included by said electrically conducting means is a carbon electrode:

5. The furnace of claim 3 in which said electrode included by said electrically conducting means in a steel electrode.

6. The furnace of claim 3 in which said vessel has a closed top through which said electrodes and said charge feeding means pass.

* * * * *